United States Patent [19]

Eckle

[11] Patent Number: 4,684,301

[45] Date of Patent: Aug. 4, 1987

[54] MACHINE TOOL SPINDLE AND TOOL HOLDER

[75] Inventor: Otto Eckle, Loechgau, Fed. Rep. of Germany

[73] Assignee: Komet Stahlhalter- und Werkzeugfabrik, Besigheim, Fed. Rep. of Germany

[21] Appl. No.: 860,284

[22] Filed: May 6, 1986

[30] Foreign Application Priority Data

Jun. 19, 1985 [DE] Fed. Rep. of Germany ....... 8517718

[51] Int. Cl.⁴ .......................... B23Q 3/12; B23B 31/02
[52] U.S. Cl. .................................... 409/232; 279/103; 408/239 R; 409/234
[58] Field of Search ............... 409/231, 232, 233, 234; 408/239 R, 239 A; 279/1 A, 103, 102

[56] References Cited

U.S. PATENT DOCUMENTS

| 2,917,975 | 12/1959 | Webster | 409/234 |
|---|---|---|---|
| 3,444,781 | 5/1969 | Sunderman et al. | 409/234 X |
| 3,554,080 | 1/1971 | Herrmann | 409/234 |
| 4,596,502 | 6/1986 | Cattani | 409/231 |
| 4,604,010 | 8/1986 | Reeves | 409/233 |

FOREIGN PATENT DOCUMENTS

| 1017317 | 12/1952 | France | 279/103 |
|---|---|---|---|
| 1515665 | 6/1978 | United Kingdom | 409/232 |
| 569394 | 8/1977 | U.S.S.R. | 409/232 |

OTHER PUBLICATIONS

VDMA-Tagung (Documents of the Firm Valenite--Modco. GmbH, D-6920 Sinheim/Elsenz, "VAL--Clamping Device for Flexible Production)-pp. 1-10.

Primary Examiner—William R. Briggs
Attorney, Agent, or Firm—Flynn, Thiel, Boutell & Tanis

[57] ABSTRACT

A machine tool spindle, which serves for interchangeably receiving tool holders (13) having different shanks (8,16), has in the spindle head (1a) thereof a frusto-conical receiving bore (3) for the reception of a steeply tapered conical shank of a first tool holder. The spindle head (1a) is provided with an end surface (4) which surrounds the frusto-conical receiving bore (3). Immediately adjacent this end surface there is provided a mating bore (8), the diameter (D) of which is slightly greater than the theoretical diameter of the frusto-conical receiving bore (3) in the plane of the end surface (4). The axial length of the mating bore (8) is equal to about 10 to 15% of the theoretical diameter. The mating bore (8) serves for the reception of a cylindrical mating extension (15) of the second tool holder (13).

14 Claims, 7 Drawing Figures

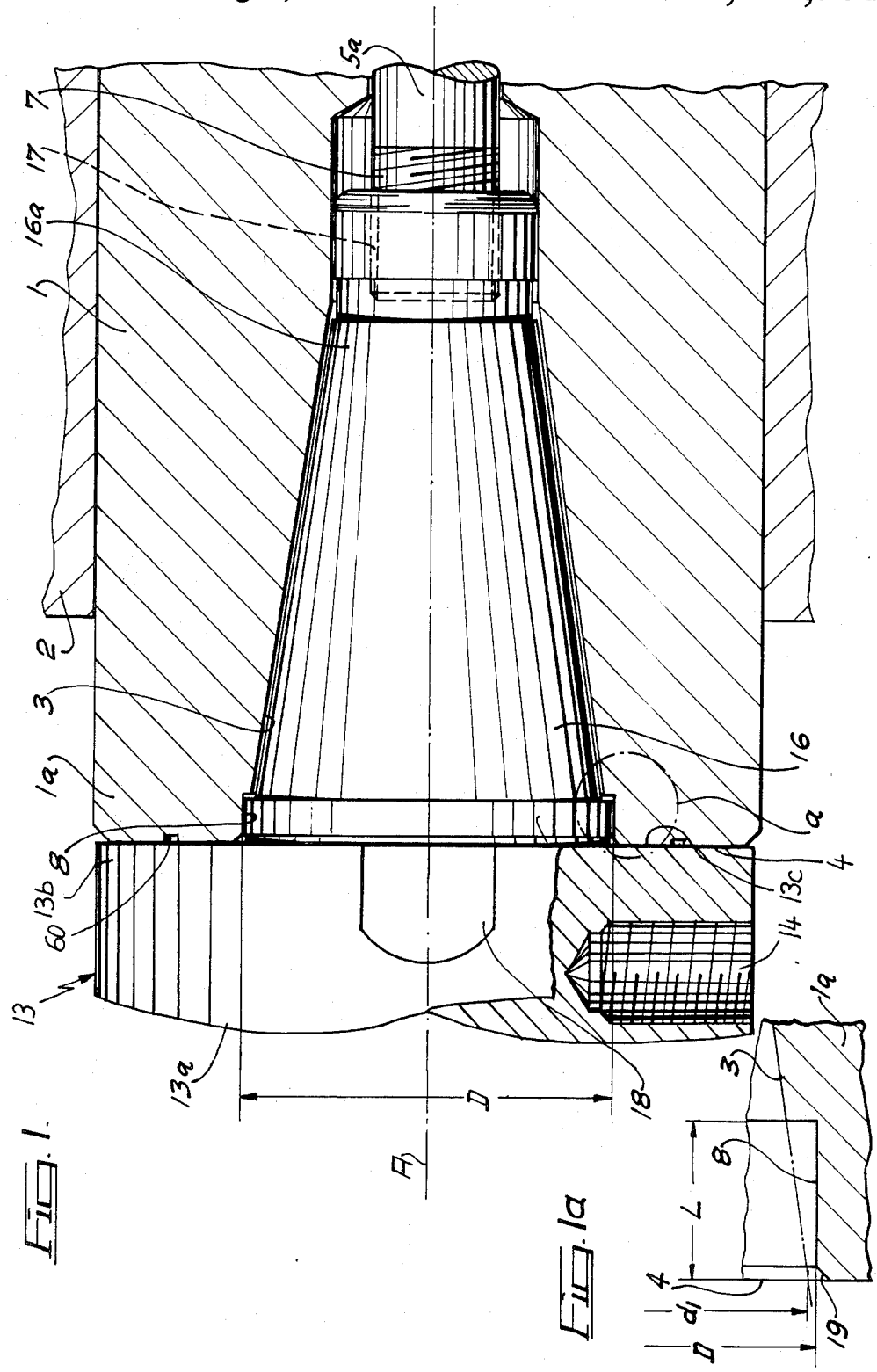

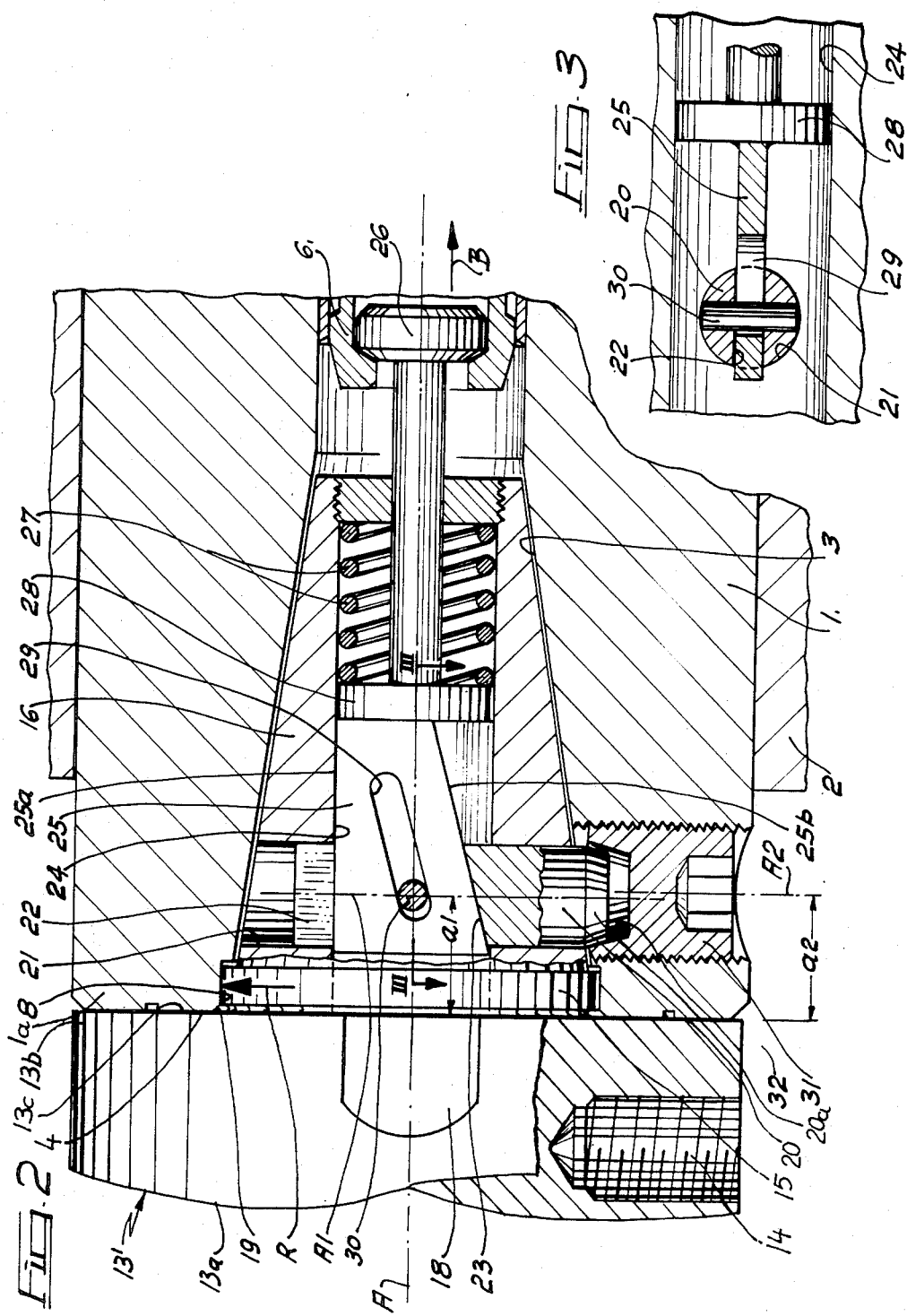

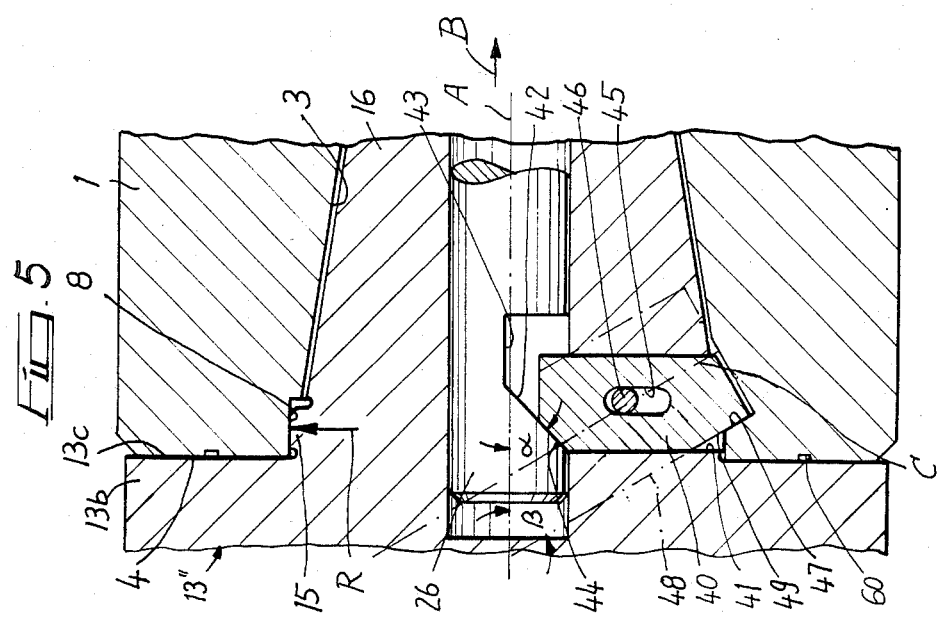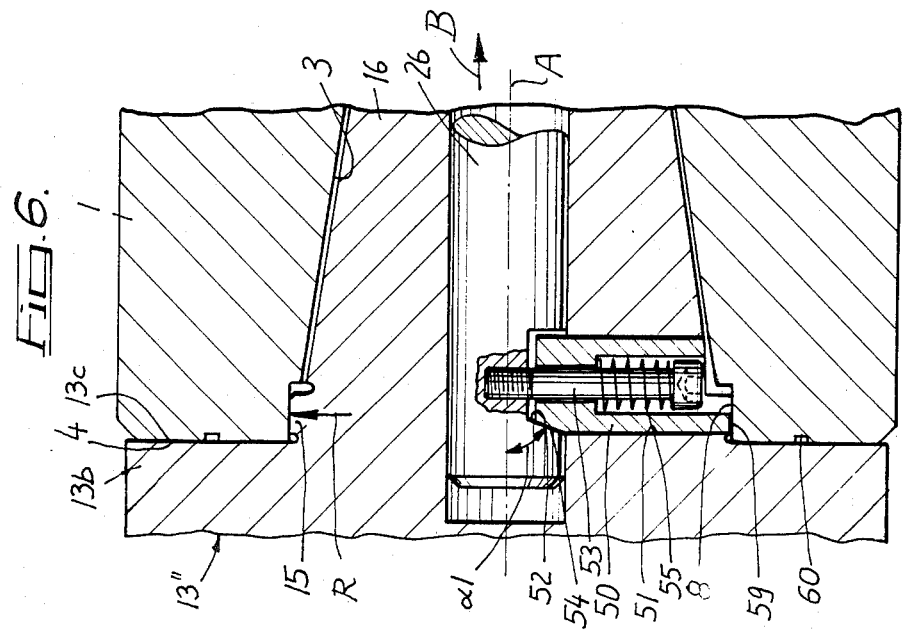

MACHINE TOOL SPINDLE AND TOOL HOLDER

FIELD OF THE INVENTION

The invention relates to a machine tool spindle and tool holders suitable therefor, with various different shanks capable of being interchangeably inserted in the head of the spindle, which machine tool spindle has a frusto-conical receiving bore for the reception of a steeply tapered conical shank of a first tool holder, an end surface surrounding the receiving bore and a cylindrical mating bore located in the region of the frusto-conical receiving bore and serving for the reception of a cylindrical mating extension on the shank of a second tool holder which is provided at one end of the mating extension with a flange concentric therewith and at the other end of the mating extension with a frusto-conical part which engages with play in the frusto-conical receiving bore when the flange is in contact with the said end surface, the spindle having provided within it a pull rod provided in the region adjoining the receiving bore with a collet or a screw-thread cooperating respectively with a draw-in bolt or screw-thread provided on the free end of each shank.

BACKGROUND OF THE INVENTION

Particulars of such a machine tool spindle were first published on Apr. 26, 1985 in Frankfurt in a VDMA-Tagung (Documents of the firm VALENITE-MODCO. GmbH, D-6920 Sinheim/Elsenz "VAL-clamping device for flexible production").

Such a known machine tool spindle serves for the selective reception of a tool holder with a conventional steeply tapered conical shank (DIN 2080 or 69871) or of a new kind of tool holder which has a cylindrical mating spigot adjoining a flange. Tool holders which have a steeply tapered conical shank usually also have a flange which is often formed with a circumferential trapezoidal groove for engagement by the changing arm of an automatic tool-changing mechanism. In the case of tool holders with a steeply tapered conical shank, however, the flange usually does not make contact with the end surface of the spindle. On the contrary, the tool holder is supported solely by the engagement of its steeply tapered conical shank in the frusto-conical receiving bore in the spindle. If then the length of this frusto-conical receiving bore is reduced by about half as a result of the provision of the cylindrical mating bore, a large part of the supporting surface between the steeply tapered conical shank and the frusto-conical receiving bore will be lost. Consequently, the connection between the tool holder and the spindle which in any case fails to satisfy modern requirements in regard to power transmission is still further seriously impaired. The centering action between the steeply tapered conical shank and the frusto-conical receiving bore is also insufficient in relation to contemporary accuracy requirements. If, however, a tool holder with a cylindrical mating extension is inserted in the spindle, then a better centering between the tool holder and the machine tool spindle will be obtained, but at the same time the supporting of the said tool holder transversely to the axis of the spindle will no longer be so good since the cylindrical mating bore commences at a greater distance from the end surface of the spindle. Furthermore, the known tool holder with a cylindrical mating extension has two diametrically oppositely located clamping members which are mounted for radial sliding movement with respect to the axis of the spindle. Between the inner ends of these clamping members an axially movable wedge is provided which is connected to a draw bolt projecting outwardly from the frusto-conical part. The draw bolt is engaged by the collet provided on the pull rod which is slidably mounted in the spindle of the machine tool. As a result of the axial movement of the said spindle, the clamping members can be forced radially outwardly so that inclinded surfaces provided on their outer ends engage in recesses formed in the wall of the mating bore. The flange is consequently pressed against the end surface of the spindle. A disadvantage of this arrangement is that no particularly high degree of accuracy is obtained in the repetitive work done during the changing of the tool holders. This can be attributed to the fact that, in spite of the close tolerances between the mating extension and the mating bore, some play must nevertheless still be present between these two parts. Since the two clamping members on the radially opposite sides of the mating extension are forced outwardly, approximately equally large reaction forces act on the mating extension in opposite directions. Depending upon the frictional relationships between the inclined surfaces, the mating spigot will be so oriented with respect of the mating bore that it will bear against the wall of the mating bore either in the vicinity of one of the clamping members or in the vicinity of the oppositely located clamping member. It may also happen, however, that the mating extension assumes some intermediate position between two limiting positions. This impairs the interchange tolerance and hence the accuracy with which operations are repeated during frequent interchanging of identical tool holders or of dissimilar tool holders to quite a substantial extent.

The problem underlying the invention is to improve a machine tool spindle and tool holders suitable therefor which have different shanks of the kind initially referred to in such a manner that, when a tool holder having a steeply tapered conical shank is inserted, the connection between it and the machine tool spindle is impaired to the smallest possible extent and that, when a tool holder having a cylindrical extension is inserted, an optimum transverse support with very great accuracy of centring is attained. Furthermore, the accuracy achieved in operations which are repeated during the changing of the tool holders will be improved.

The solution of this problem consists according to the invention in that the mating bore directly adjoins the end surface of the spindle and the diameter thereof is slightly greater than the theoretical diameter of the frusto-conical receiving bore in the plane of the end surface and that the axial length of the mating bore is equal to only about 10 to 15% of the theoretical diameter.

Since the mating bore has only a relatively short axial length, only a relatively small part of the frusto-conical receiving bore is lost by the provision of the mating bore. During the insertion of a tool holder having a steeply tapered conical shank, a relatively large supporting surface is available between the said steeply tapered conical shank and the frusto-conical receiving bore, despite the presence of the cylindrical mating bore, so that the connection between the steeply tapered conical shank and the machine tool spindle is scarcely impaired at all by the provision of the mating bore. The arrangement of the mating bore directly adjacent the end surface of the machine tool spindle has the advantage that, during the insertion of tool holders having a cylindrical mating extension, the transverse support of the tool holder takes place in the immediate vicinity of the end surface. Forces acting transversely to the axis of the spindle are consequently transmitted in a most favourable manner from the tool holder to the spindle and vice versa. This is of special importance in the case of tool holders with a cylindrical mating extension, since these tool holders, because of the wide area support of their flanges against the end surface of the machine tool spindle, are particularly suitable for the transmission of relatively large working forces. Furthermore, it is also possible to keep the tolerance between the cylindrical mating extension and the cylindrical mating bore particularly close, since because of the short axial lengths of both parts they must also be displaced axially through only a very small distance with respect to each other.

A particularly advantageous arrangement of the invention consists in the fact that a clamping member is arranged for sliding movement in a radial guideway provided in the frusto-conical member in the vicinity of the mating extension, which clamping member is radially movable by means of a wedge surface engaging its inner end and connected with the draw-in bolt arranged for axial sliding movement in the frusto-conical part and is provided at its outer end with a thrust surface which can be pressed against a counter-surface provided on the spindle.

The use of only one clamping member has the advantage that, during the outward displacement of the clamping member and the pressing thereof against the counter-surface, a reaction force is produced on the cylindrical mating extension which brings the latter into contact with the wall of the mating bore on the side thereof diameterically opposite the clamping member. The tool holder is thereby automatically brought to bear, during each tool change, in a clearly defined manner against the same side of the mating bore. By this means very small interchanging tolerances are obtained with a high degree of accuracy of repetition.

BRIEF DESCRIPTION OF THE DRAWINGS

The invention is explained in greater detail below with reference to embodiments illustrated in the drawings, in which:

FIG. 1 shows a first embodiment partly in longitudinal section,

FIG. 1a shows details of the part a of FIG. 1 on an enlarged scale,

FIG. 2 shows a second embodiment partly in longitudinal section,

FIG. 3 is a partial section taken on the line III—III in FIG. 2,

FIGS. 5 and 6 show two further embodiments in longtudinal section.

DETAILED DESCRIPTION

Figure 4:
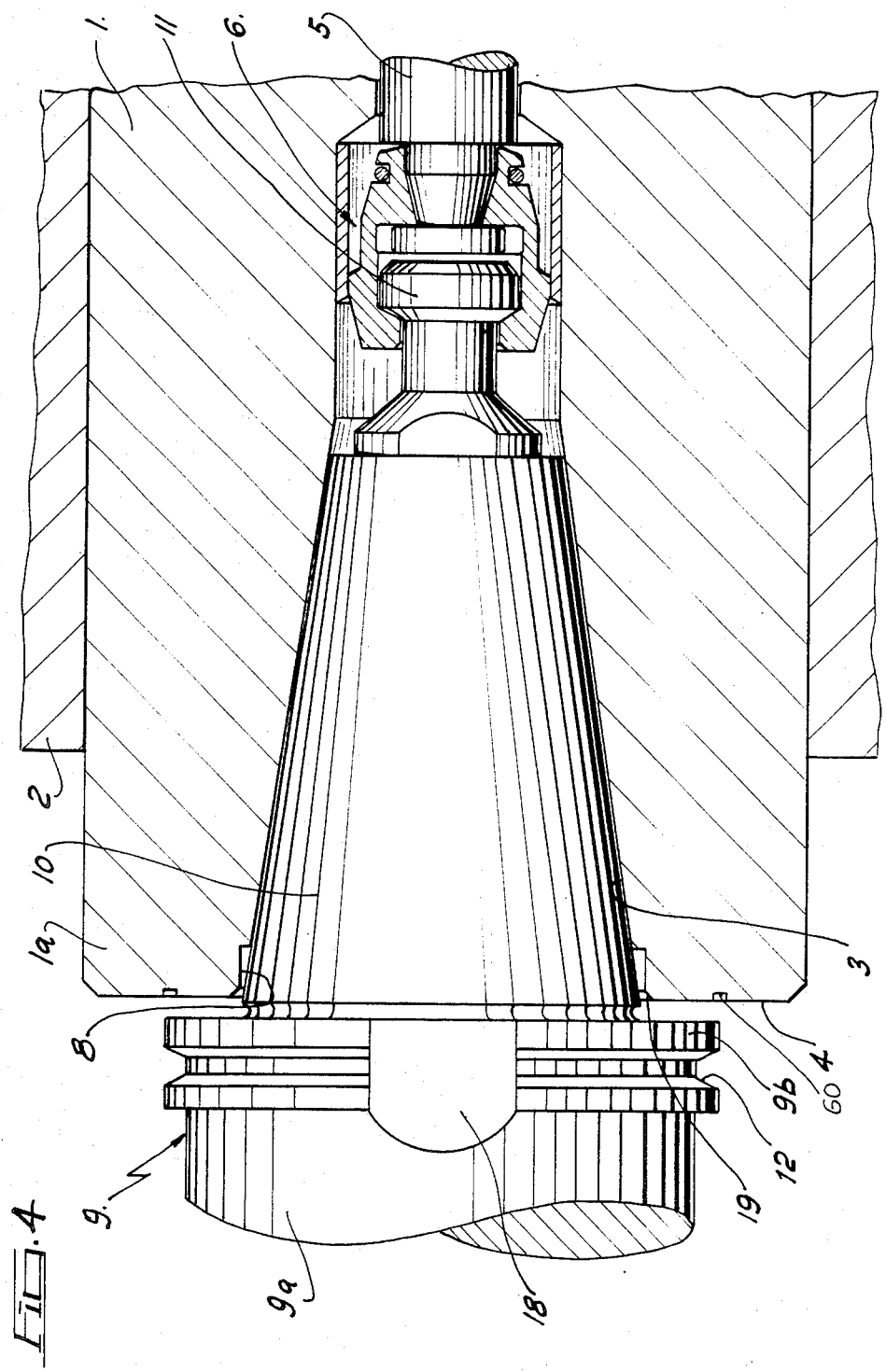
FIG. 4 shows the machine tool spindle according to the invention with a conventional steeply tapered frusto-conical shank part inserted therein.

The machine tool spindle 1 is rotatably mounted in the headstock 2. The machine tool spindle 1 is formed in the head 1a thereof with a frusto-conical receiving bore 3 which is shaped and arranged in accordance with DIN 2079 or with the corresponding International Standards Organisation Norm. The receiving bore 3 is surrounded by an annular end surface 4 disposed at right angles to the axis A of the spindle. In a central bore in the spindle 1 there is also mounted for axial sliding movement a pull rod 5 which carries, at its front end in the region of the frusto-conical receiving bore 3, a collet 6 and is axially displaceable against the force of plate springs (not shown) relatively to the head 1a of the spindle (FIGS. 2 and 4).

As shown in FIG. 1, the pull rod 5a may, instead of being provided with a collet 6, have a screw-thread 7 and be rotatably mounted in the spindle 1.

The spindle head 1a has, directly adjacent the end surface 4a and in the region of the receiving bore 3, a cylindrical mating bore 8. The diameter D of this mating bore 8 is only slightly greater, by about 1 mm, than the theoretical diameter d1 which the frusto-conical receiving bore 3 would have in the plane of the end surface 4. This theoretical diameter d1 is defined in DIN 2079 and amounts for example to 69.95 mm for spindle heads of size No. 50. Details of this theoretical diameter d1 and of the diameter D of the mating bore 8 are shown in FIG. 1a. The mating bore 8 is axially relatively short, the axial length L thereof measured from the end surface 4 being about 10–15% and preferably about 12% of the theoretical diameter d1. The diameter D of the mating bore 8 is produced with a tolerance of +0.002 to +0.005 mm.

A first tool holder 9, which may carry at its free end 9a a tool (not shown), for example a drill head, a turning tool, a milling cutter, a reamer or the like, may be inserted into the frusto-conical receiving bore 3 of the machine tool by means of its steeply tapered conical shank 10 which is formed in accordance with DIN 2080 or 69871. A draw-in stud 11 according to DIN 69872, which is engaged by the collet 6, may be provided on the rear free end of the steeply tapered conical shank 10. The said shank 10 is drawn into the spindle 1 by the action of plate springs and at the same time is pressed against the wall of the frusto-conical receiving bore 3. The flange 9a with the trapezoidal groove 12 which is intended for engagement by the gripping jaws of an automatic tool-changing mechanism is consequently located at a distance from the end surface 4, since for production technology reasons it is not possible to make the machine tool spindle 1 or the very different tool spindles so that not only does the steeply tapered conical shank 10 lie in contact with the wall of the receiving bore 3 but the flange 9 also lies in contact with the end surface 4.

A second tool shank 13 is shown in FIG. 1 on the free end 13a of which once again a tool (not shown) is mounted. The tool holder 13 is moreover provided with a flange 13b.

The tool holder 13 has directly adjacent the flange 13b a cylindrical mating extension 15 which will fit with the minimum possible radial tolerance in a mating bore 8. The diameter of the mating extension 15 is produced with a tolerance of about −0.003 mm and the axial length thereof, measured from the annular surface 13c of the flange 13b, is slightly shorter, by about, 0.5 mm, than the axial length of the mating bore 8, thereby ensuring that the tool holder 13 always lies with its annular surface 13c in direct surface-to-surface contact with the end surface 4 of the head 1a of the spindle without the mating extension 15 coming into contact with the base of the mating bore 8.

Adjoining the mating extension 15 is a frusto-conical part 16 which is, however, so dimensioned that a certain amount of play is present between the outer surface thereof and the wall of the receiving bore 3 when the annular surface 13c is in contact with the end surface 4. A draw-in stud which cooperates with a tension-applying collet may once again be provided on the free end 16a of the frusto-conical part in a manner similar to that shown in FIG. 4, or alternatively an internally screw-threaded bore 17 may be provided, as shown in FIG. 1, into which the pull rod 5a with its external screw-thread 7 can be screwed. In this case, the pull rod 5a is mounted so as to be rotatable but not axially displaceable in the spindle 1 and the toolholder 13 is drawn into the head 1a of this spindle by the action of the interengaging screw threads 7, 17. Moreover, the tool holder 13 is accurately centred with respect to the spindle 1 by the engagement of the mating extension 15 in the mating bore 8. In addition, the annular surface 13c of the flange 13b is pressed into engagement with the end surface 4. Since the frusto-conical part 16 engages with play in the receiving bore 3, the pressure exerted by the annular surface 13c against the end surface 4 corresponds to the full tension exerted by the pull rod 5a or by the screw threads 7, 17. Transverse forces which act on the tool holder 13 are transmitted to the spindle via the mating extension 15 and the mating bore 8 at a location directly adjacent the end surface 4. The usual driving elements according to DIN 2079 which engage in two diameterically oppositely located driving grooves 18 in the flange 13b may furthermore be provided on the head 1a of the spindle for the transmission of the torque.

On insertion of the tool holder 13 into the head 1 of the spindle the frusto-conical part 16 serves first of all as a rough guide means. The frusto-conical part 16 engaging in the frusto-conical bore 3 produces a pre-centring of the tool holder. Since, however, there is a step between the cylindrical mating extension 15 and the maximum diameter of the frusto-conical part 16, it is advantageous to provide a chamfer 19 between the end surface 4 and the cylindrical mating bore 8, which chamfer may be disposed at 45° with respect to the axis A of the spindle. The radial extent of this chamfer must be equal to at least half the difference between the diameter of the mating extension 15 and the maximum diameter of the frusto-conical part 16 in the region of the mating extension 15. The chamfer 19 has a centring effect on the mating extension 15 and facilitates the insertion thereof into the mating bore 8. Instead of the chamfer 19 on the head 1a of the spindle a correspondingly large chamfer could be provided at the transition between the mating extension 15 and the frusto-conical part 16. It would also be possible for chamfers 19 to be provided both on the head of the spindle and on the cylindrical mating extension 15, in which case the radial extents of both chamfers must together be equal to somewhat more than half the difference between the diameter of the mating extension 15 and the maximum diameter of the frusto-conical part 16.

The force of the plate springs acting on the pull rod 5 in machine tools which are already available is fixed and for spatial reasons cannot be increased at will. Consequently and above all in order to increase the accuracy with which operations are repeated during a number of tool changes, i.e. to keep the permissible dimensional variations during such tool changes as small as possible, the clamping device shown in FIG. 2 is advantageously provided. In this clamping device, a cylindrical clamping member 20 is slidable radially in the frusto-conical part 16 in a transverse bore 21 which serves as a guide. The clamping member 20 has at its outer end a frusto-conical end part 20a or an inclined surface extending obliquely to the axis A of the spindle. The clamping member 20 furthermore has a slot 22 which terminates in a wedge surface 23 disposed obliquely to the axis A of the spindle. A wedge 25 is axially slidable in an axial bore 24 in the frusto-conical part 16. This wedge 25, which is supported in the axial bore 24 by means of its rear surface 25a, is rigidly connected to the draw-in bolt 26. A compression spring 27 presses against a cylindrical collar 28 provided between the draw-in bolt 26 and the wedge 25 and thereby biases the wedge to move in the direction towards the mating extension 15. In addition, the wedge 25 has a slot 29 which extends parallel to the inclined wedge surface 25b. A cross-pin 30 fixed in the clamping member 20 engages with play in this slot 29. A screw 31 provided with a frusto-conical cavity 32 is screwed radially into the head 1a of the spindle. The apex angles of this frusto-conical cavity 32 and of the frusto-conical end part 20a are of equal size. The axis A1 of the clamping member 20 is located at a distance of a1 from the annular surface 13c which is somewhat smaller than the distance a2 of the axis A2 of the screw 31 from the end surface 4. The arrangement of the tool holder 13' shown in FIG. 2 so far as the flange 13b, the mating extension 15, the frusto-conical part 16 and other component parts are concerned corresponds to that in the embodiment shown in FIG. 1, and consequently the same references are used for corresponding parts and foregoing description is applicable mutatis mutandis.

So long as the tool holder 13' is not clamped in the spindle 1, the wedge 25 is urged forward by the action of the spring 27 in the direction towards the mating extension 15. By means of the slot 29 and the cross-pin 30, the clamping member 20 is moreover held with its frusto-conical end part 20a within the frusto-conical part 16. When the draw-in bolt 26 is engaged by collet 6 and is drawn by the latter in the direction B, the wedge 25 also moves in the direction B so that its wedge surface 25b slides along the wedge surface 23 of the clamping member 20 and pushes the latter radially outward. As a result, the frusto-conical end part 20a is urged into the frusto-conical cavity 32. Due to the axial displacement of the axes A1 and A2, the annular surface 13c is pressed against the end surface 4. The wedge surfaces 23 and 25b or the frusto-conical surfaces 20a and 32 moreover produce a reinforcement of the clamping force exerted by the plate springs on the pull rod 5. It is also important, however, that as a result of the engagement of the frusto-conical end part 20a in the frusto-conical cavity 32, a reaction force R is exerted in a radial direction which constantly urges the mating extension 15 in the same direction against the wall surface of the mating bore 8 at a postiion diamterically opposite the screw 31. The desired high degree of accuracy in the repetition of operations is thus obtained with close interchange tolerances. The clamping member 20 is shown in FIG. 2 some distance away from the mating extension 15 only to make it clearly visible. It should, however, be located as close as possible to the mating extension 15 so as to avoid the possibility of tilting forces which could be caused by the radially outward displacement of the clamping member 20 to one side. If the clamping member 20 is brought nearer to the mating extension 15, the axial length of the frusto-conical part 16 can also be reduced.

Instead of the trapezoidal groove 12 shown in FIG. 4, another form of gripping surface may be provided according to FIGS. 1 and 2 on the flange of the respective tool holder 13, 13' for the arm of an automatic tool-changing mechanism. Advantageously, this consists of a radial screw-threaded bore 14 for engagement with the clamping screw of a prismatic gripping member such as is shown in FIGS. 1 and 2 of the European Patent Application published under NO. 0 125 529.

In FIGS. 5 and 6, two further embodiments of the invention are shown which differ from the embodiment shown in FIGS. 2 and 3 essentially as regards the construction of the clamping members and of the parts which cooperate with them. The construction of the tool holder 13" shown in FIGS. 5 and 6 corresponds, so far as the flange 13b of the mating extension 15 and the frusto-conical part 16 as well as other component parts are concerned, to the embodiment shown in FIG. 1, for which reason the same references are used for the corresponding parts and the foregoing description is applicable mutatis mutandis.

In the case of the embodiment shown in FIG. 5, a cylindrical clamping member 40 is mounted for radial sliding movement in a transverse bore 41 formed in the frusto-conical part 16. The clamping member 40 has at its inner end a wedge surface 42 which encloses with the axis A of the spindle an angle $\alpha$ of for example 45°. The draw-in bolt 26 which is axially slidable in the frusto-conical part 16 has a recess 43 with a wedge surface 44 which is inclined at the same angle with respect to the axis of the spindle and cooperates with the wedge surface 42. In order that the clamping member 40 should not be able to escape accidentally from the transverse bore 41 when the tool holder 13" is removed from the spindle 1, the clamping member is formed with a slot 45 in which a cross-pin 46 fixed in the frusto-conical member 16 engages.

On the spindle 1 there is provided a counter-surface 47 which coacts with the clamping member 40. This counter-surface 47 constitutes part of the wall of a recess formed by means of an end-milling cutter 48 which is indicated in chain-dotted lines in FIG. 5. The axis C of the end-milling cutter 48 is moreover inclined at an acute angle with respect to the axis A of the spindle, so that the counter-surface 47 formed by means of the end mill is also inclined at an acute angle $\beta$ with respect to the axis A of the spindle. The angle $\beta$ should be at least 45°, preferably about 60°. At the outer end of the clamping member 40 there is provided a thrust surface 49 which is inclined at the same angle $\beta$, this thrust surface having a curvature which corresponds to the curvature of the counter-surface 47 and consequently has a radius corresponding to that of the end-milling cutter 48.

If the draw-in bolt 26 is moved in the direction B by means of a pull rod (not shown) which engages it by means of a collet or preferably a screw-thread, the clamping member 40 will then be displaced radially by the action of the wedge surfaces 42,44. Its thrust surface 49 is then pressed against the counter-surface 47 so that radial and axial components of force are produced. The axial component of force reinforces the pressure of the annular surface 13c against the end surface 4 of the spindle 1. The radial component of force produces a radially directed reaction force R which urges the mating extension 15, always in the same direction against that part of the wall of the mating bore which is located diametrically opposite the clamping member 40. By this means the desired high degree of accuracy is obtained in repeated tool changing operations with small tolerances. It is important in this connection that the transverse bore 41 should also extend partly into the cylindrical mating extension 15, so that the thrust surface 49 acts against the counter-surface 47 in the region of the cylindrical mating extension 15. By this means tilting forces, which could result from the clamping member driven out to one side, are avoided.

The tool holder 13" shown in FIG. 6 is constructed and arranged in a similar manner to the foregoing embodiment, for which reason the same references are used for parts which function in the same manner. The cylindrical clamping member 50 is slidable in a radial transverse bore 51 in the conically tapered shank 16, which transverse bore also extends into the region of the mating extension 15. A wedge surface 52 provided on the draw bolt 26 cooperates with a corresponding wedge surface 54 on the inner end of the clamping member 50. The angle $\alpha 1$ which the wedge surfaces enclose with the axis A of the spindle should be as large as possible so that only a limited radial force is transmitted via the clamping member 50 from the tool holder 13" to the spindle 1. A self-locking of the wedge surfaces 52,54 cannot, however, occur. The clamping member 50 is of hollow construction and has in its interior bore a screw 53 which is screwed into the draw-in bolt 26. Furthermore, a return spring 55 is provided which exerts on the clamping member 50 a radially inwardly directed restoring force. On the radially outer end of the clamping member 50 there is provided a thrust surface 59 which cooperates with the mating bore 8. For this reason the thrust surface 59 is curved in the circumferential direction of the mating extension 15 with a radius which corresponds to that of the mating bore 8.

If a force is exerted in the direction B on the draw-in bolt 26 by means of the pull rod (not shown), the clamping member 50 will be displaced radially by means of the wedge surfaces 52,54 and at the same time its thrust surface 59 will be pressed against the wall of the mating bore 8. Consequently a radial force R is produced which constantly urges the mating extension 15 in the same direction against that part of the wall of the mating bore 8 which is located radially opposite the clamping member 50. The accuracy with which operations are repeated is thus ensured. As soon as the thrust surface 59 engages the wall of the mating bore 8, the relative movement of the draw-in bolt 26 and the clamping member 50 is interrupted. The force of the pull rod acting on the draw-in bolt 26 in the axial direction B then presses the annular surface 13c of the tool holder 13" against the end surface 4 of the spindle 1.

The tool holder or its flange should preferably be so large that the flange extends over the entire end surface 4 of the spindle and lies in contact with the whole of the said end surface 4. Partial overlapping of this end surface 4 by the flange would of course gradually lead to deformations of the end surface of the spindle. It may so happen, however, that the spindle has to have connected with it a tool holder the flange of which is constructed and arranged according to DIN 69871 and has a trapezoidal groove so that the appropriate tool can be picked up by a conventional tool-changing mechanism. In this case, the flange has, when used with the most commonly employed steeply tapered cone No. 50, a diameter of 97.5 mm. In order that such tools provided with a flange of this diameter should leave no markings caused by their outer edges, it is advisable to provide an annular groove 60 in the end surface 4 thereof near the said outer edge. This annular groove 60 is located on a diameter of 97.5 mm and extends radially outwardly and inwardly from this diameter for about 1 mm, so that the said annular groove has a total width of about 2 mm. Consequently, the outer edge of a flange having an outside diameter of 97.5 mm is located in the region of the annular groove 60 and deformations of the end surface 4 in this region are avoided.

The embodments of the invention in which an exclusive property or privilege is claimed are defined as follows:

1. In a machine tool spindle and tool holders suitable therefor, with various different shanks capable of being interchangeably inserted in the head of the spindle, which machine tool spindle has a frusto-conical receiving bore for the reception of a steeply tapered conical shank of a first tool holder, an end surface surrounding the receiving bore and a cylindrical mating bore located in the region of the frusto-conical receiving bore and serving for the reception of a cylindrical mating extension on the shank of a second tool holder which is provided at one end of the mating extension with a flange concentric therewith and at the other end of the mating extension with a frusto-concial part which is received with play in the frusto-conical receiving bore when the flange is in contact with the said end surface, the improvement comprising wherein the mating bore (8) directly adjoins the end surface (4) of the spindle (1) and the diameter (D) thereof is slightly greater than the theoretical diameter (d1) of the frusto-conical receiving bore (3) in the plane of the end surface (4) and that the axial length (L) of the mating bore (8) is in the range of 10 to 15% of the theoretical diameter (d1).

2. The machine tool spindle according to claim 1, wherein the diameter (d) of the mating bore (8) is approximately 1 mm greater than the theoretical diameter (d1).

3. The machine tool spindle according to claim 1, wherein the axial length (L) of the mating bore (8) is approximately 12% of the theoretical diameter (d1).

4. The machine tool spindle according to claim 1, wherein a chamfer (19) is provided between the end surface (4) and the cylindrical mating bore (8), which chamfer (19) bridges the difference in diameter between the mating extension (14) and the frusto-conical part (16).

5. The machine tool spindle according to claim 1, wherein a chamfer which bridges the difference in diameter between the frusto-conical shank (16) and the mating extension (15) is provided between these two parts.

6. The machine tool spindle according to claim 1, wherein a clamping member (20, 40, 50) is arranged for sliding movement in a radial guideway (21, 41, 51) provided in the frusto-conical part (16) in the vicinity of the mating extension (15), which clamping member is movable radially by means of a wedge surface (25a, 42, 52) engaging its inner end, is connected with the draw-in bolt (26), which is axially slidable in the frusto-conical part (16), and is provided at its free outer end with a thrust surface (20a, 49, 59) which can be pressed against a counter-surface (32, 47, 8) provided on the spindle (1).

7. The machine tool spindle according to claim 6, wherein the clamping member (20, 40, 50) is cylindrical and is guided in a transverse bore (21, 41, 51) in the frusto-conical part (16).

8. The machine tool spindle according to claim 7, wherein the transverse bore (21, 41, 51) extends partly into the cylindrical mating extension (15).

9. The machine tool spindle according to claim 8, wherein the mating bore (8) forms the counter-surface and the thrust surface (59) has a radius which corresponds to that of the mating bore (8).

10. The machine tool spindle according to claim 6, wherein the thrust surface (49) and the counter-surface (47) are inclined at equal acute angles ($\beta$) with respect to the axis (A) of the spindle.

11. The machine tool spindle according to claim 1, wherein an annular groove (60) having a width of approximately 2 mm, is provided in the end surface (4) of the spindle at a diameter of 97.5 mm.

12. The machine tool spindle according to claim 6, wherein the thrust surface is a frusto-conical surface (20a) and the counter-surface is formed by a frusto-conical recess (32) in a screw (31) which is screwed into the spindle (1).

13. The machine tool spindle according to claim 7, wherein the clamping member (20a) extends substantially over the entire cross-section of the frusto-conical part (16) and has a slot (22) extending over part of its length in which the wedge (25) engages.

14. The machine tool spindle according to claim 6, wherein the clamping member (50) is of hollow construction and a screw (53) which is screwed into the draw-in bolt 26 and a return spring (55) are located in the interior of the clamping member (50), the return spring exerting a radially inwardly directed restoring force on the clamping member (50).

* * * * *